June 13, 1961  J. H. GODFREY ET AL  2,988,119
DEPTH GAGE FOR A MOTOR OPERATED HAND TOOL
Filed Jan. 7, 1959  2 Sheets-Sheet 1

*INVENTORS*
JAMES H. GODFREY
KESTUTIS DAMIJONAITIS
BY
Lindsey and Prutzman
ATTORNEYS June 13, 1961  J. H. GODFREY ET AL  2,988,119
DEPTH GAGE FOR A MOTOR OPERATED HAND TOOL
Filed Jan. 7, 1959  2 Sheets-Sheet 2
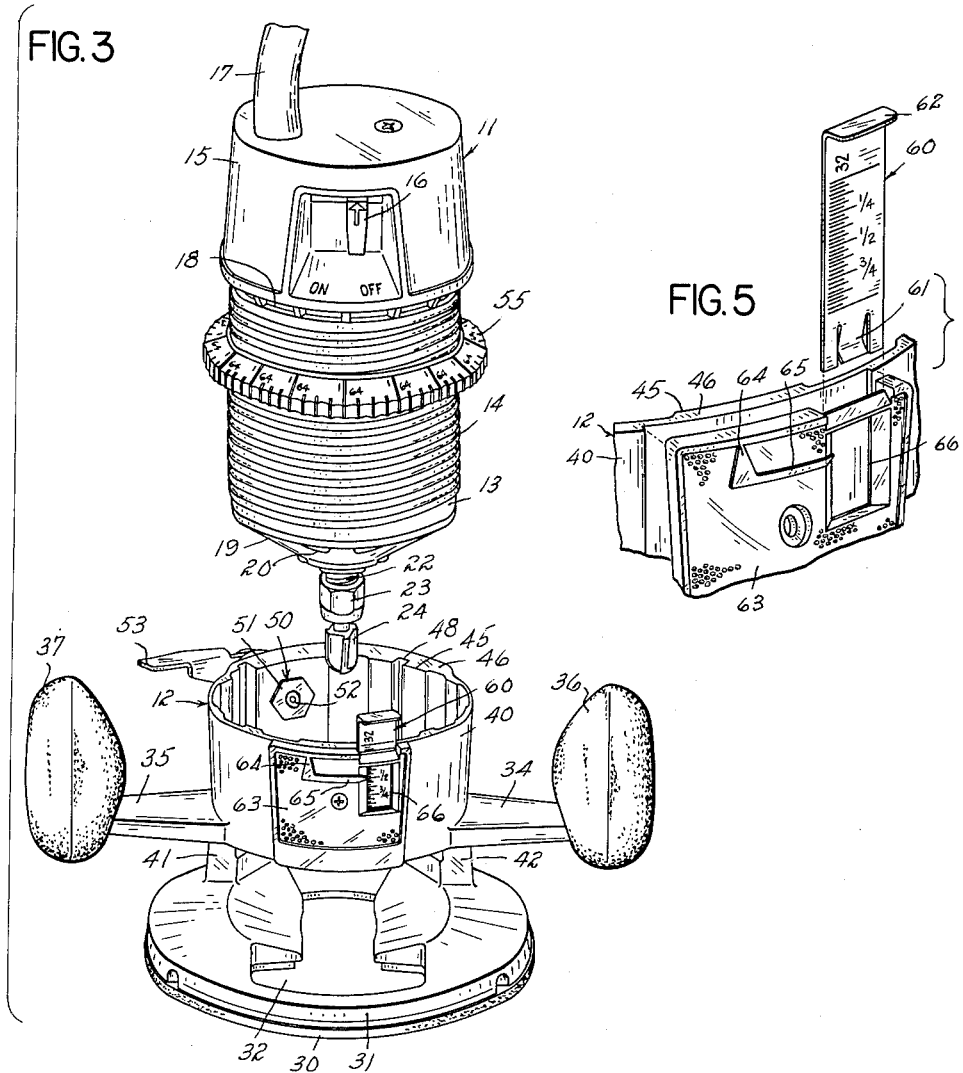
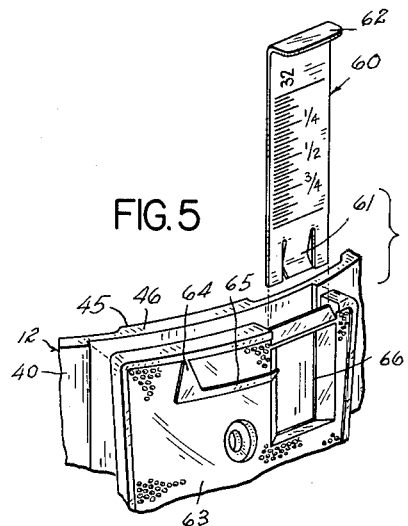
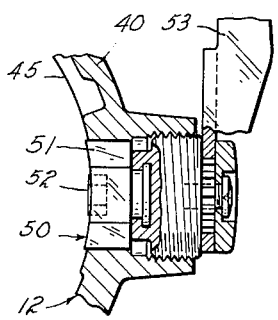
INVENTORS
JAMES H. GODFREY
BY KESTUTIS DAMIJONAITIS
Lindsey and Prutzman
ATTORNEYS

United States Patent Office 2,988,119
Patented June 13, 1961

2,988,119
DEPTH GAGE FOR A MOTOR OPERATED HAND TOOL
James H. Godfrey, Berlin, and Kestutis Damijonaitis, Newington, Conn., assignors to The Stanley Works, New Britain, Conn., a corporation of Connecticut
Filed Jan. 7, 1959, Ser. No. 785,495
6 Claims. (Cl. 144—136)

The present invention generally relates to routers, and more particularly to an improved structure for adjustably positioning the motor unit in the base of the router so as to vary the depth of cut. The invention has particular utility for routers in which the motor has a generally vertical shaft to which the cutting tool is affixed and in which the motor is adjustably positioned on a portable base having a flat work engaging undersurface for positioning and guiding the tool.

It is a primary object of this invention to provide an improved depth of cut adjustment for a router or the like that is easily operated to provide effective and accurate positioning of the router cutting tool relative to the router base and work surface.

It is a further object of this invention to provide an improved depth of cut adjustment for a router that provides both coarse and vernier adjustments in an easily operable, effective and accurate manner.

It is a still further object of this invention to provide a router having a motor that is releasably secured to the base by an effective and easily operable lock.

An additional object of this invention is to provide a router having an effective depth of cut adjustment which is easily and economically manufactured and which is accurate and effective in operation.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 3 is an exploded view of the router of FIG. 1;

FIG. 5 is a partial exploded view of the depth of cut indicator; and

FIG. 6 is a partial cross-section view taken along the lines 6—6 of FIG. 2.

Figure 1:
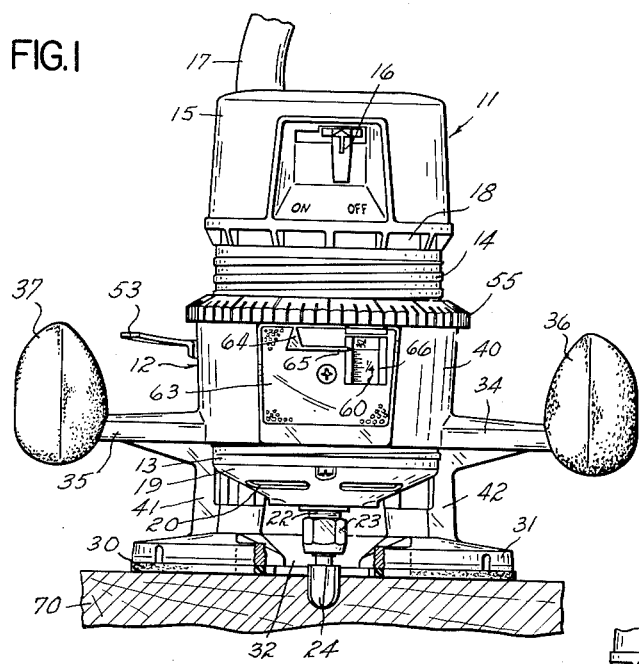
FIG. 1 is a front elevation view of a preferred embodiment of the router of this invention with a cutting tool in working position.

Referring to the drawings and particularly FIGS. 1 and 3, it is seen that a preferred embodiment of a router of this invention generally comprises a motor unit 11 supported by a base 12. Motor unit 11 includes an electric motor housed within a generally cylindrical outer motor casing 13 which is provided with square or "Acme" threads 14 throughout a substantial portion of its length. Motor unit 11 is provided with a control housing 15 which encloses and protects motor "On-Off" switch 16 and provides a mounting for the electrical cable 17 that serves to energize the motor. Motor unit 11 is provided with a series of peripheral air intake passages 18 adjacent housing 15 and a plurality of spaced air outlet passages 20 in end housing 19. Air drawn in through intake passages 18 and exhausted through outlet passages 20 by a conventional fan (not shown) provides cooling of the electric motor and blows the chips, etc. away from the work portions of the tool so as to insure good visibility of the work piece. Cutting tool 24 is releasably secured to shaft 22 by collet or chuck 23.

Figure 4:
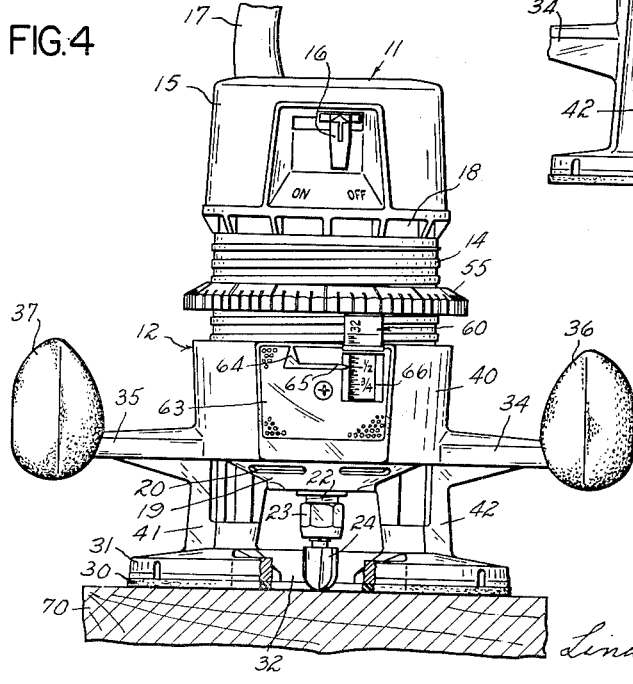
FIG. 4 is a front elevation view of the router of FIG. 1.

Base 12 is provided with a fiber or other non-marring work-engaging surface 30 which is secured to the underside of platform 31 in any desired manner. As seen in FIGS. 3 and 4, platform 31 is generally circular in configuration and is provided with a central aperture 32 through which the cutting tool 24 extends to engage the work piece. Generally cylindrical motor support housing 40 is positioned in spaced relationship to platform 31 by upstanding abutments 41 and 42 and is provided with radially extending arms 34 and 35 having hand grips 36 and 37 at their outer ends. In the preferred embodiment, platform 31, abutments 41 and 42, arms 34 and 35, and motor housing 40 are die cast as an integral unit.

Figure 2:
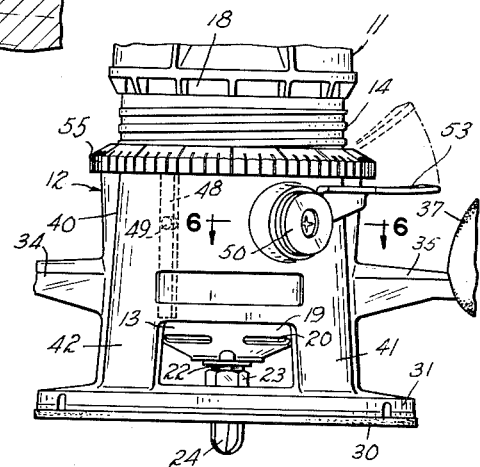
FIG. 2 is a partial rear elevation view of the router of FIG. 1.

Central aperture 45 in housing 40 is dimensioned to slidably receive motor casing 13 and end wall 46, surrounding aperture 45, is arranged in the preferred embodiment to be substantially parallel to the work engaging surface 30. Housing 40 is also provided with a longitudinal slot 48 along the inner sidewall of aperture 45 (see FIG. 2) which cooperates with the radially extending pin or abutment 49 on motor casing 13 to prevent relative rotation between the motor casing and the base.

Relative vertical movement between motor casing 13 and motor support housing 40 is prevented by locking stud 50 in the rear wall of housing 40. As most clearly seen in FIGS. 2, 3, and 6, locking stud 50 threadably engages motor support housing 40 and carries operating lever 53 and locking member 51 having nylon insert 52 mounted therein. Locking member 51 is rotatably supported on stud 50 and has an irregular shape which engages the adjacent side walls of support housing 40. As lever 53 is rotated, locking stud 50 is slidably moved radially of support housing 40 so as to bring nylon insert 52 and locking member 51 into and out of frictional locking engagement with motor casing 13. As is apparent from FIGS. 1 and 3, lever 53 is positioned relative to hand grip 37 to permit operation of the lock by the operator's thumb and forefinger without removing the hand from the grip.

Easily controlled adjustment of the vertical position of motor housing 13 (and cutting tool 24) relative to motor support housing 40 (and the work piece) is provided by adjusting ring 55 which is internally threaded to cooperate with threads 14 on motor casing 13. Thus, with locking lever 53 in the "unlocked" position and abutment 49 of motor housing 13 in alignment with groove 48 of motor support housing 40, motor casing 13 can be inserted into aperture 45 of base 12 until the flat bottom of adjusting ring 55 engages the generally flat end wall 46 of motor support housing 40. The vertical position of motor casing 13 relative to base 12 is adjustably determined by the position of adjusting ring 55 on motor casing 13, which ring is easily moved by the operator while still grasping grips 36 and 37 because of the location of grips 36 and 37 relative thereto. This movement is facilitated by the ridges on the outer periphery of ring 55.

To provide accurate pre-setting of the depth of cut, an adjustable indicator is provided on motor support housing 40. As is most clearly seen in FIG. 5, the indicator includes a generally rectangular tab or slide 60 having a deformed spring end 61 that impedes slide movement and a bent-over end 62 that is engageable by adjusting ring 55. Slide 60 is guided for longitudinal sliding movement relative to motor support housing 40 by support frame 63 which is fastened to the front of motor support housing 40. Index lines 64 and 65 are embossed or otherwise marked on frame 63, and, in the preferred embodiment, slide 60 is provided with 1/32" gradations along its face so that as slide 60 is moved upwardly from frame 63, an increasing indication of distance is displayed in window 66 opposite index line 65.

Further understanding of the various features of this invention and their inter-relation can best be obtained by describing the operation of the aforementioned structure. Referring first to FIG. 4 wherein the router and cutting tool are shown resting on a wooden work piece 70, it is seen that lifting of locking lever 53 releases locking stud 50 to permit lifting of motor casing 13 relative to work piece 70 and base 12. After motor casing 13 has been elevated, locking lever 53 is again depressed to fixedly position motor casing 13 relative to base 12 and adjusting ring 55 is backed-off a considerable distance from end 46 of motor support housing 40. Depth of cut indicating slide 60 is then elevated by grasping bent-over end 62 until the desired depth of cut is displayed in window 66 opposite index line 65. As seen in FIG. 4, the ½" mark is opposite index line 65 and adjusting ring 55 has been screwed down until it just engages bent-over end 62 of indicator slide 60. Adjusting ring 55 is now ½" above end 46 of motor support housing 40 so that release of lock 50 by lifting lever 53 permits motor casing 13 to drop into motor support housing 40 until adjusting ring 55 engages end 46 and slide 60 is at the "zero" position. This "drop-in" movement is accomplished simply by lifting base 12 or by moving base 12 to a position wherein tool 24 can drop below the surface of work piece 70. Depression of lever 53 re-engages lock 50 so as to positively position motor casing 13 and tool 24 relative to base 12 to provide a ½" depth of cut.

The foregoing depth of cut adjustment is made simply by placing the router upright on any flat surface. After the desired depth has been pre-set, the motor is permitted to drop relative to the platform to establish the desired cutting tool position. No tipping or inversion of the router is required nor are any auxiliary tools or measuring scales required.

In the event that the 1⁄32" gradations on slide 60 do not provide the desired accuracy for the depth of cut, locking ring 55 can be provided with peripheral indicia as seen in FIG. 3. The distance between each major indicating point represents 1⁄64" vertical travel of motor casing 13 and cutting tool 24 relative to base 12 and the work piece. The index or indicating arrow 64 is positioned to co-operate with the indicia on locking ring 55 so that vernier adjustment of the depth of cut is easily provided.

As is apparent from ease of assembly of motor casing 13 to base 12, motor casing 13 can easily be removed for use with other power tools without necessitating extensive disassembly procedures. Such added flexibility provides a substantial reduction in the cost of a plurality of power tools which can be designed to utilize a single electric motor drive.

It is also apparent that the router of this invention provides an easily operated depth of cut adjustment that is extremely accurate as well as durable in use and economical to manufacture.

As will be apparent to persons skilled in the art, various modifications and adaptations of the structure above described will become readily apparent without departure from the spirit and scope of the invention, the scope of which is defined in the appended claims.

We claim:

1. In a router, a threaded motor casing, a base having an opening formed therein for slidably receiving said casing, an adjusting ring threadably engaging the motor casing and abuttingly engageable with the base so that rotation of said adjusting ring adjusts the position of said motor casing vertically relative to said base, said ring and said motor casing being movable axially relative to said base, a depth of cut indicator slide, and means slidably mounting said indicator slide on said base for engagement by said adjusting ring and for vertical movement relative to said base, said indicator slide having indicia thereon cooperating with a fixed index point on said housing whereby said indicator slide shows the position of said adjusting ring relative to said base.

2. In a router, a threaded cylindrical motor casing, a base having a central cylindrical opening formed therein for slidably receiving said casing, an adjusting ring threadably engaging the motor casing and abuttingly engageable with the end walls of the base surrounding said central cylindrical opening, said ring and said motor casing being movable axially relative to said base, locking means carried by said base and engageable with said motor casing to fixedly position said motor casing relative to said base, and a depth of cut indicator slide carried by said housing adjacent said central cylindrical opening, said slide being vertically slidable relative to said housing and engageable with said adjusting ring and including indicia thereon cooperating with said base to indicate the position of said adjusting ring relative to said base.

3. In a router, an electric motor, a generally cylindrical casing for said motor, said casing having a threaded outer periphery, a base having a work engaging surface and a generally cylindrical upstanding motor support, said motor support being provided with a generally cylindrical aperture adapted to receive said motor casing and having an upper end wall generally parallel to the work engaging surface, an adjusting ring threadably engaging the motor casing and in abutting engagement with the upper end wall of the motor support portion of said base, and locking means carried by said base and engageable with said motor casing to fixedly position said motor casing relative to said base, said locking means comprising a stud threadably received in the motor support portion of said base, a locking member rotatably supported on the inner end of said stud and having a nylon insert carried thereon, and a lever fixed at the outer end of said stud whereby movement of said lever causes said stud and nylon insert to advance into abutting engagement with said motor casing.

4. In a router, a threaded cylindrical motor casing, a base having a central cylindrical opening formed therein for slidably receiving said casing, an annular adjusting ring threadably engaging the motor casing and abuttingly engageable along its lower wall with the upper end wall of the base surrounding said cylindrical opening, said ring and said motor casing being axially movable relative to said base, a depth of cut indicator slide, means supporting said slide for vertical sliding movement relative to said base and having an index point thereon cooperating with the indicator slide, said indicator slide having an upper transverse end portion engageable with said adjusting ring so as to be moved thereby and having a deformed lower end cooperating with the means supporting the slide to frictionally hold the slide in a preselected vertical position, and indicia on said indicator slide cooperable with said index point to indicate the position of said adjusting ring relative to the upper end wall of said base.

5. In a router, a threaded cylindrical motor casing, a base having a central cylindrical opening formed therein, an adjusting ring threadably engaging said motor casing and abuttingly engageable with the end walls of said base surrounding the central cylindrical opening, a pair of handles extending radially from said base on opposite sides thereof, said handles having grips positioned thereon to be grasped by the operator for guiding the router base, said ajusting ring having ridges on its outer periphery to permit rotary adjustment of the ring while the operator grasps the grips, a depth of cut indicator slide, means mounting said indicator slide on said base for slidable movement relative thereto, one end of said indicator slide being engageable by said adjusting ring, and a lock carried by said base and engageable with said motor casing to fixedly position said motor casing relative to said base, said lock having an operating lever carried on its outer end, said lever being positioned on said base relative to one of said grips to permit operation of said lever while the operator's hand grasps the last-named grip.

6. In a router, a motor casing having a shaft rotatably supported therein, means on one end of said shaft for releasably retaining a cutting tool therein, a base for supporting said motor casing relative to a work piece, said motor casing being slidably received in said base, a ring disposed about said motor casing, means adjustably positioning said ring on said casing, said ring being movable with said motor casing and engageable with said base to position said motor casing and the end of said shaft relative to said base, a depth of cut indicator slide and means supporting said indicator slide for movement generally parallel to the motor, said indicator slide having depth of cut indicia thereon and having a portion thereof engageable with said ring thereby to indicate the position of said ring relative to said base.

References Cited in the file of this patent

UNITED STATES PATENTS

| | | |
|---|---|---|
| 1,745,780 | Casey | Feb. 4, 1930 |
| 1,899,883 | Sacrey | Feb. 28, 1933 |
| 2,613,704 | Sacrey | Oct. 14, 1952 |
| 2,756,785 | Godfrey | July 31, 1956 |
| 2,842,173 | Turner et al. | July 8, 1958 |
| 2,855,963 | Potter | Oct. 14, 1958 |
| 2,867,251 | Moretti et al. | Jan. 6, 1959 |